Jan. 8, 1946.  E. M. SPLAINE  2,392,418
OPHTHALMIC MOUNTING
Original Filed Oct. 21, 1939  2 Sheets-Sheet 1
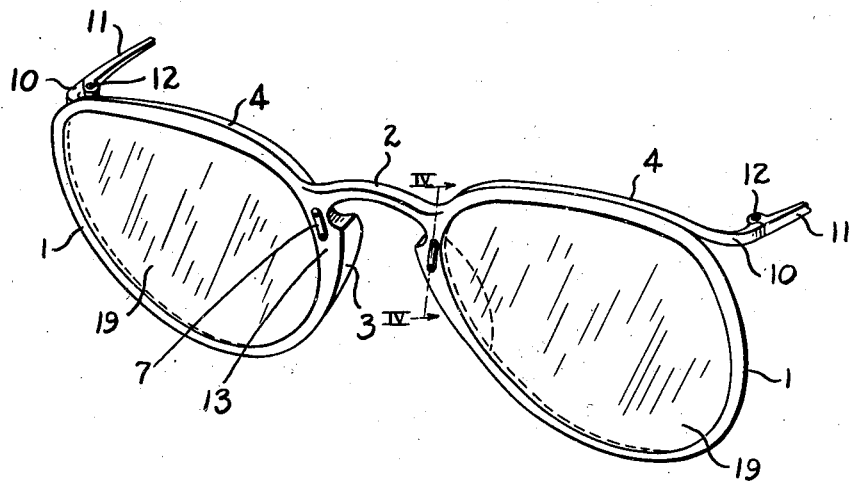
Fig. I
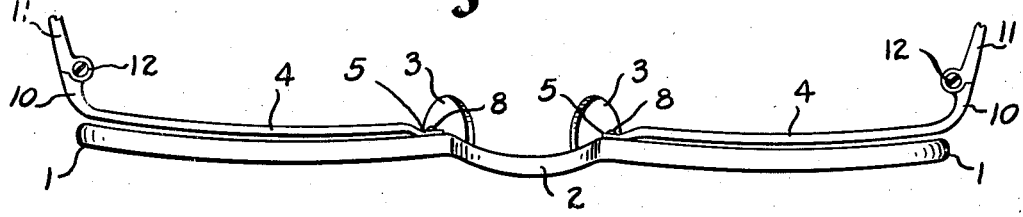
Fig. II
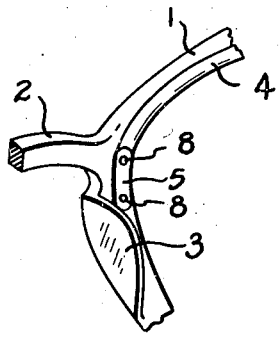
Fig. III
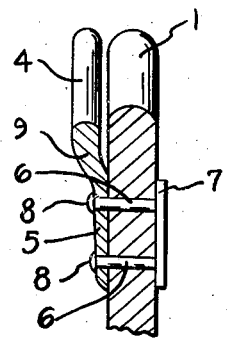
Fig. IV
INVENTOR
EDWARD M. SPLAINE
BY
*Louis L. Gagnon*
ATTORNEY

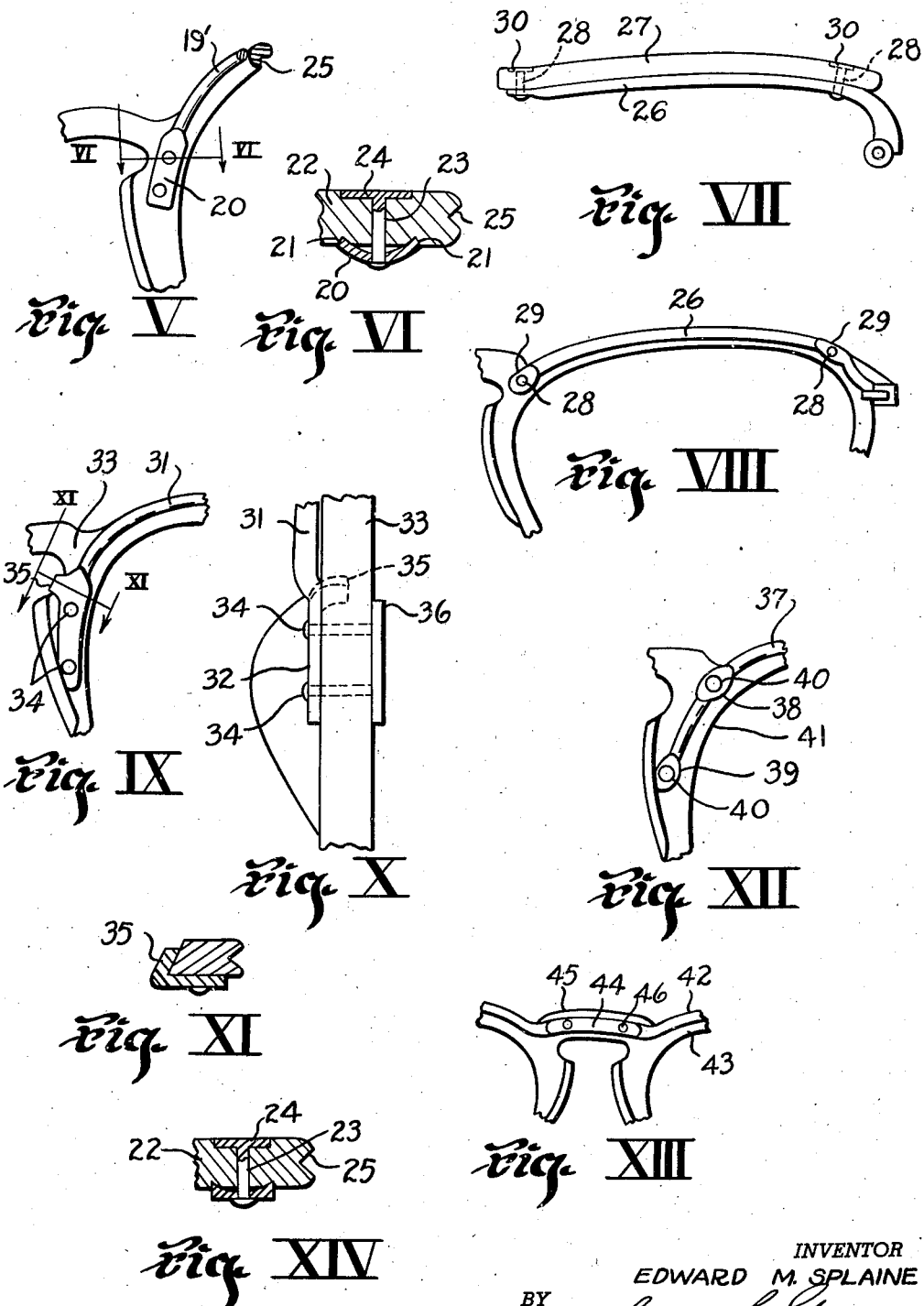

Patented Jan. 8, 1946

2,392,418

UNITED STATES PATENT OFFICE 2,392,418

OPHTHALMIC MOUNTING

Edward M. Splaine, Southbridge, Mass., assignor to American Optical Company, Southbridge, Mass., a voluntary association of Massachusetts Original application October 21, 1939, Serial No. 300,605. Divided and this application April 17, 1943, Serial No. 483,413

2 Claims. (Cl. 88—41)

This invention relates to improvements in ophthalmic mountings.

This application is a division of my copending application Serial No. 300,605, filed October 21, 1939, now issued as Patent No. 2,316,817.

One of the principal objects of the invention is to provide an ophthalmic mounting having a non-metallic lens supporting structure and relatively long and slender adjustable temple supports shaped to follow the upper contour portions of said lens supporting structure.

Another object is to provide an ophthalmic mounting, of the above character, having its temple supports above the useful field of vision when the mounting is in position of use on the face of the wearer, that is, so that the temples lie at least above the center of the pupils of the eyes when the mounting is on the face.

Other objects and advantages of the invention will become apparent from the following description taken in connection with the accompanying drawings and it will be apparent that many changes may be made in the details of construction and arrangement of parts without departing from the spirit of the invention as expressed in the accompanying claims. I, therefore, do not wish to be limited to the exact arrangement disclosed as the preferred form only has been given by way of illustration.

Referring to the drawings:

Fig. I is a perspective view of an ophthalmic mounting embodying the invention;

Fig. II is a plan view of the mounting illustrated in Fig. I;

Fig. III is a fragmentary rear perspective view of the assembly of the lens and temple supporting structure;

Fig. IV is an enlarged fragmentary sectional view taken as on line IV—IV of Fig. I;

Fig. V is a fragmentary rear elevation illustrating a modification of the invention;

Fig. VI is an enlarged fragmentary sectional view taken as on line VI—VI of Fig. V;

Fig. VII is a fragmentary plan view of another modification;

Fig. VIII is a rear elevation of the device illustrated in Fig. VII;

Fig. IX is a fragmentary partial rear elevation of a further modification of the invention;

Fig. X is a side elevation of the construction illustrated in Fig. IX;

Fig. XI is a fragmentary sectional view taken as on line XI—XI of Fig. IX;

Fig. XII is a view generally similar to Fig. IX but of a further modification;

Fig. XIII is a partial rear view of an alternate form of the invention; and

Fig. XIV is a view similar to Fig. VI showing a further modification of the invention.

The invention relates particularly to the provision of an ophthalmic mounting having a lens supporting structure with face engaging portions formed of non-metallic material which is light in weight and comfortable on the face and which is resistant to corrosion and tarnish and in which the lenses may be quickly and easily assembled without the necessity of having divided lens supporting rims with mechanical means for securing the lenses in said rims, and to the provision of adjustable temple supporting members which will afford a relatively wide range of adjustment without disturbing the suporting relation of the lenses and which will be relatively inconspicuous when the mounting is viewed from the front and which will avoid having undesirable protruding portions or horn-like projections at the sides of the mounting, which might be accidentally engaged by the hand when placing the mounting on the face and will also avoid danger of dislodging the mounting from the face and of having the said mounting fall and break the lenses.

Another feature of the invention is to provide a protective marginal rim about the contour edges of the lenses which will have a relatively smooth contour surface and which will support the lenses in desired fixed spaced relation with each other during the use of the mounting.

Referring more particularly to the drawings wherein like characters of reference designate like parts throughout the several views the mounting embodying the invention comprises a pair of lens rims I preferably formed of non-metallic material which is light in weight, non-corrosive and non-tarnishing in nature and which will permit the lenses 19 to be snapped into assembled relation therewith and which will retain its shape and afford protection for the lenses during use. The material of the lens rims is preferably a synthetic resin having the characteristics of methyl methacrylate and may be cellulose, shell or horn-like material, all of which are light in weight and have non-corrosive characteristics. The lens rims are joined by an integral bridge 2 of the same material as the lens rims and also have rearwardly deflected nose bearing pads 3 of the same material. Relatively long and slender bar-like temple supports 4 are provided with ends 5 which are flattened so as to have a relatively wide side surface contact with the rear surface of the front of the mounting adjacent the bridge, as illustrated in Figs. II to IV inclusive. The ends 5 of the temple supports 4 are secured in surface contact with the rear surface of the front of the mounting by rivets or the like 6 carried by a plate 7. The rivets 6 extend through the front of the mounting and through spaced openings in the end portion 5 and are headed over as illustrated at 8 to secure the said end 5 to the front. The portions 5 extend upwardly to the rearwardly deflected portions 9 which blend into the relatively long and slender bar-like portions 4 so as to space said bar-like portions 4 slightly from the lens rims 1 throughout the upper contour of said rims and are adapted to hold said bar-like portions 4 in the rear of said rims when the parts are in desired assembled and adjusted relation with each other. The relatively long and slender bar-like temple supports 4 terminate in rearwardly extending temple attaching ends 10 to which the temples 11 are pivotally attached as illustrated at 12. The ends 10 extend rearwardly from a point adjacent the upper outer contour edges of the lens rims and are preferably located above the useful field of vision when the mounting is in desired location on the face, that is, the said ends are adapted to lie at least above the centers of the pupils of the eyes when the mounting is in fitted relation with the face and when the eyes are in the position of normal straight ahead vision.

To provide an attachment area adjacent the nose bearing pads 3 the front of the mounting has a widened area 13 on the nasal sides of the lens rims. The rivets or the like 6 may extend entirely through the plates 7, as illustrated in Fig. I, or may be secured to the rear surface of the plate 7 as by soldering, welding or the like, or may be formed integral therewith, as desired, so that the front surface of the plate 7 will be relatively smooth so that suitable design engravings may be applied thereto. It is to be understood that the plate 7 may be formed to any desirable contour shape. The purpose of utilizing the plates 7 and of flattening out the end 5 is to provide relatively wide areas of contact so that the parts may be secured in rigid relation with each other without danger of having the material of the front of the mounting break down.

It is also to be understood that the plate 7 may be embedded, so that the outer face thereof is in flush relation with the outer or front surface of the lens supporting structure.

In adjusting the mounting to the facial characteristics of different individuals the relatively long and slender temple supports are first adjusted to follow the upper contour portions of the lens rims and the rearwardly extending temple supports are simultaneously positioned so as to extend rearwardly from a point located adjacent the upper temporal edges of the lenses. To fit the temples to the facial requirements of different individuals and to position the lenses in desired angular relation to the line of straight ahead vision of said individuals the rearwardly extending portions 10 adjacent the pivotal connection 12 are adjusted inwardly or outwardly, or upwardly or downwardly relative to the lens supporting rims. Care is taken that during the forming of these latter adjustments the temple supports and rearwardly extending portions 10 remain in desired adjusted relation with the lens rims.

Because of the fact that the temple supports are separate from the lens supporting rims, the said rims may be expanded under the action of heat by a suitable expanding tool commonly used in the art whereby the lenses may be snapped into the lens supporting rims 1 which upon contracting will hold the lenses therein. It is to be understood that the said lenses are provided with commonly known bevelled edges fitting within the V-shaped grooves internally of the rims. This placing of the lenses in the lens rims will not disturb the adjusted relation of the temple supports.

Although the end 5 is described as being provided with spaced perforations for attachment with the rivets 6, it is to be understood that the said rivets may be integrally formed on said end and that the plate 7 could be provided with the spaced openings to receive the rivets, therefore enabling the end of the rivet to be headed over. It is also apparent that instead of utilizing rivets any other suitable type of connecting means may be used, for example, a screw or solder united connecting member.

It is also to be understood that although the relatively long and slender temple supports are described as preferably being adjusted to follow the rear of the upper contour portion of the lens rims the said supports may be shaped to follow the upper contour edges of said lens rims in the plane of the lenses or may be disposed in the front of the plane of the lenses, but in all instances, it is preferable that they be shaped to the upper contour shape of the lens rims.

As shown in Figs. V and VI there is shown a modified form of the invention wherein the relatively long and slender temple support 19', simulating the temple support 4, is provided with a flared end 20 which is cupped or bent so as to provide spaced longitudinal edges 21 which, when the flared end 20 is secured to the front 22 by the rivets or the like 23, are adapted to become embedded in the material of the front 22 so as to lock the temple support 19' against side play relative to the front of the mounting during use. It is to be understood the various flared portions and overlying plate-like members may be embedded in the material of the front or may be in surface to surface relation therewith as desired. The rivets 23 are carried by a plate 24 preferably embedded within the material of the front 22 so that its outer surface is flush with the adjacent surface of said front. A V-groove 25 is formed in the lens rims of the front for receiving the bevelled edge of the lens and for holding said lens in the lens rim.

Figs. VII and VIII illustrate a further modification wherein a relatively long and slender temple support 26 similar to the support 19' is secured to the lens rim 27 by spaced rivets or the like 28. The temple support 26 is provided with flared or flattened portions 29 in the vicinity of the rivets or the like 28 so as to increase the bearing surface of the support with the lens rim at said locations. In this instance, the rivets 28 are provided with enlarged heads 30 having a relatively wide bearing surface with the front surface of the lens rim. The purpose of the enlarged heads 30 and the flared portions 29 is to provide increased bearing surface with the material of the front so as to avoid breaking down the said material when the parts are secured in connected relation with each other.

In Fig. IX there is illustrated a further modification wherein a relatively long and slender temple support 31, generally similar to the above mentioned temple support, is provided with a flared end 32 secured to the front 33 by spaced rivets or the like 34. In this instance, the flared end 32 is provided with a bent lip portion 35 which is shaped to fit about a side surface of the front adjacent the bridge, as illustrated in Fig. XI. The purpose of this lip is to aid in retaining the relatively long and slender temple support 31 in adjusted relation with the lenses and prevent sagging of the outer temporal end of the support. The rivets 34 are joined with a plate 36 providing a wide bearing surface with the front.

In Fig. XII there is illustrated a further modification wherein a relatively long and slender temple support 37 similar to the temple support 31 is provided with spaced flared portions 38 and 39 which are connected by rivets or the like 40 to the front 41. Each of the rivets extends through the material of the front and is provided with an enlarged head providing a wide bearing surface with the adjacent surface of the front. The spaced rivet connections provide means for relatively rigidly retaining the temple support 37 in adjusted position.

In Fig. XIII is illustrated a further modification of the invention in which the temple support 42 extends continuously from one temple to the other as is shown in part. The temple arm 42 extends along the upper contour edges of the lens holding members 43 in a manner similar to that shown in the other structures of this invention, and has a flared portion 44 extending across the rear of the bridge 45 and having its surface which lies adjacent the bridge of a contour such as will allow a close and intimate surface to surface relation between the bridge 45, and flared portion 44.

The temple support 42 may be connected to the bridge 45 by rivets or the like 46.

It is to be understood that variations in this structure and its positional relation with the bridge 45 and lens holders 43 are readily conceivable and I therefore do not wish to be limited to the exact structure shown and described.

It is also to be understood that all of the flared end portions of the temple supports may be cupped or bent, as illustrated in Fig. VI, so as to provide spaced edge portions which will become embedded in anchored relation with the material of the front.

Instead of cupping or bending the various flared portions of the temple supports so as to provide spaced edges for engaging and becoming embedded in the material of the front, only the under surface of said flared portions may be hollowed out so as to provide edge portions which will become embedded in the material of the front, as shown in Fig. XIV. This can be accomplished by a suitable swedging, milling or grooving operation.

The various flared portions of the temple supports, set forth above, have a different cross-sectional shape than the main body portion of said supports and are flared so as to have a greater surface contact area than said main body portion. In one of the preferred constructions the main body portion has a relatively round or oval cross-sectional shape and the flared portions have a rectangular cross-sectional shape with the widest portion of the rectangle disposed so as to engage or contact the front so as to provide a relatively wide bearing surface. This is true of all of the constructions set forth herein.

In Fig. VI it will be noted that the flared portion 20 is cupped and the edge portions 21 embedded in the body 22. It is to be understood that the portions 20 and/or 24 may or may not be embedded or partially so as desired. The portion 20 ordinarily would be embedded at its edges 21 to an extent which is due only to the pressure and heat of assembly.

In connection devices of this type in which an opening is first made through the resin material of the body 22 and thereafter a pin put through said opening and a flared substantially flat metal portion such as 20 is assembled over the end of the pin, it has been found that the forming of the opening through the body material tends to create an upstanding distorted portion adjacent one end of the opening and that a flat member assembled over a pin on this portion has only a substantially single line ring type contact with the body portion due to the fact that the body is elevated adjacent the opening and therefore the flat member may contact the body portion only on a rounded surface which allows only the ring contact mentioned above. This makes a very poor connection particularly when there is such a long arm extending from said connection and such a great amount of leverage due to said length of arm and this produces an undesirable rocking action about the connection. When assemblies of this type have been made, therefore, it has been very difficult to regulate the flexing action of an arm such as 19' shown in Fig. V because of the poor connection. It is difficult to so assemble an arm with such a connection as to produce exactly the flexing desired without a great deal of adjustment and it is difficult to provide two arms on the same frame which have the same flexing ability.

This difficulty may be obviated by grinding or otherwise flattening the face of the body portion 22 adjacent the opening so as to form a flat surface on which the surface of a flat metal portion may rest but even this arrangement has not been found to be entirely satisfactory. The preferred structure therefore is that which is shown in cross section in Fig. VI, that is, a member 20 is cupped longitudinally thereof to a trough-like shape as shown in Fig. VI. This arrangement provides a portion 20 with two edge contacts 21 and provides clearance centrally thereof to take care of any distortion which may be formed on the body portion during the forming of the opening in which the pin 23 rests. With this arrangement it will be seen that excessive care need not be taken in forming the opening through the body portion and also in forming the surface of the portion 20 since it is not essential with a structure such as shown in Fig. VI to provide surface to surface contact.

It is to be understood that the material of the fronts including the lens rims and bridge is non-metallic and that the relatively long and slender temple supports are preferably formed of metal which is pliable so as to permit adjustments but is sufficient rigid so as to retain its adjusted positions. The said relatively long and slender temple supports may also be formed of resilient material or different portions thereof may be formed to have one or another of the above pliable or resilient characteristics.

From the foregoing description it will be seen that simple, efficient and economical means have been provided for accomplishing all of the objects and advantages of the invention.

Having described my invention, I claim:

1. A device of the character described comprising a front embodying a pair of continuous undivided non-metallic lens rims of expandable and contractable material connected by a bridge member having continuous uninterrupted contour edges on the temporal sides thereof, a pair of long and slender metallic temple supports shaped substantially to follow the upper contour shape of the rims and to lie in the rear thereof, each of said long and slender supports having an integral flattened end portion secured to the front adjacent the opposed sides of the bridge member by means projecting forwardly of said flattened area into the material of said front thereby anchoring the nasal ends of said long and slender temple supports to said front and means carried by said long and slender metallic temple supports adjacent the temporal sides of the rims projecting forwardly of said temple supports and having a portion engaging with the material of the lens rims at said location for retaining the portions of the long and slender metallic temple supports shaped to follow substantially the upper contour shapes of the rims in alignment with said rims and each of said temple supports having a temporal end portion turning rearwardly of the rims and terminating in a temple pivotal connection.

2. A device of the character described comprising a front embodying a pair of continuous undivided non-metallic lens rims of expandable and contractable material connected by a bridge member having continuous uninterrupted contour edges on the temporal sides thereof, a pair of long and a slender metallic temple supports shaped substantially to follow the upper contour shape of the rims and to lie in the rear thereof, each of said long and slender supports having an integral flattened end portion secured to the front adjacent the opposed sides of the bridge member by means projecting forwardly of said flattened area into the material of said front thereby anchoring the nasal ends of said long and slender temple supports to said front and means carried by the long and slender metallic temple supports and extending forwardly thereof and into the material of the adjacent rim adjacent the temporal side thereof to anchor and retain the long and slender supports in connected relation with the rims at said spaced points and for retaining said supports in alignment with the rims, and each of said temple supports turning rearwardly of the plane of the rims and from adjacent the temporal sides thereof and terminating in a temple pivotal connection.

EDWARD M. SPLAINE.